(12) United States Patent
Horsman et al.

(10) Patent No.: US 10,779,453 B2
(45) Date of Patent: Sep. 22, 2020

(54) AGRICULTURAL IMPLEMENT FOR USE AFTER INSTALLATION OF DRAINAGE TILE

(71) Applicant: Soil-Max, Inc., Terre Haute, IN (US)

(72) Inventors: Bryan David Horsman, Terre Haute, IN (US); Joseph Henry Irwin, Jr., West Terre Haute, IN (US)

(73) Assignee: SOIL-MAX, INC., Terre Haute, IN (US)

( * ) Notice: Subject to any disclaimer, the term of this patent is extended or adjusted under 35 U.S.C. 154(b) by 154 days.

(21) Appl. No.: 15/849,332

(22) Filed: Dec. 20, 2017

(65) Prior Publication Data

US 2019/0183027 A1   Jun. 20, 2019

(51) Int. Cl.
| | | |
|---|---|---|
| *A01B 35/18* | (2006.01) | |
| *A01B 49/02* | (2006.01) | |
| *A01B 33/02* | (2006.01) | |

(52) U.S. Cl.
CPC ............ *A01B 35/18* (2013.01); *A01B 49/022* (2013.01); *A01B 33/02* (2013.01)

(58) Field of Classification Search
CPC ....... A01B 33/00; A01B 33/04; A01B 33/103; A01B 49/02; A01B 49/022; A01B 49/027; A01B 35/18; A01B 33/022
See application file for complete search history.

(56) References Cited

U.S. PATENT DOCUMENTS

| | | | | |
|---|---|---|---|---|
| 843,369 | A * | 2/1907 | Schreiber ............. | A01B 49/027 172/177 |
| 2,408,361 | A * | 10/1946 | Bagan .................. | A01B 33/022 172/119 |
| 3,658,135 | A * | 4/1972 | Thompson ........... | A01B 33/028 172/42 |
| 3,876,013 | A * | 4/1975 | Dunn ..................... | A01B 31/00 172/71 |
| 4,019,723 | A * | 4/1977 | Urbanczyk ............. | C05F 17/02 241/101.742 |
| 4,402,365 | A * | 9/1983 | Goertzen ............... | B62D 51/06 172/39 |
| 4,618,004 | A * | 10/1986 | Howard ................. | A01B 13/16 172/176 |
| 5,253,467 | A * | 10/1993 | Sims, Jr. .................. | B01F 7/02 56/365 |
| 8,844,254 | B2 * | 9/2014 | Hansen .................. | A01D 78/02 56/372 |
| 2013/0298429 | A1 * | 11/2013 | Niemela .................. | E01H 5/04 37/242 |

* cited by examiner

*Primary Examiner* — Jessica H Lutz
(74) *Attorney, Agent, or Firm* — Goodhue, Coleman & Owens, P.C.

(57) ABSTRACT

An agricultural implement includes a main frame, a rotating blade assembly operatively connected to the main frame, the rotating blade assembly comprising a shaft having a plurality of blades mounted thereto, and a first grader blade and a second grader blade operatively connected to the main frame. Both the first grader blade and the second grader blade follow the rotating blade assembly such that in operation the plurality of blades positioned along the rotating blade assembly chop up a soil heave into smaller pieces of dirt and may for provide for pushing the soil towards a center. The first grader and the second grader may further push the dirt towards the center.

20 Claims, 8 Drawing Sheets

AGRICULTURAL IMPLEMENT FOR USE AFTER INSTALLATION OF DRAINAGE TILE

FIELD OF THE INVENTION

The present invention relates to agricultural implements. More particularly, but not exclusively, the present invention relates to an agricultural implement to rehabilitate soil after installation of drainage tile.

BACKGROUND

Tile systems are recognized for providing crop producers with numerous benefits such as assisting with improved root development, increased crop yields, conservation of topsoil through reduction of runoff, and more efficient equipment operation in wet areas of a field. Drainage tile may be installed in various ways including through use of a tile plow. After installation of drainage tile, displaced soil remains from the process which may form a heave and large chunks of soil may be present all of which can interfere with normal agricultural operations. What is needed is a way to better restore the displaced soil to where it was removed from and to do so in a single pass.

SUMMARY

Therefore, it is a primary object, feature, or advantage of the present invention to improve over the state of the art.

It is a further object, feature, or advantage of the present invention to restore displaced soil to where it was removed from after drainage tile installation.

It is a still further object, feature, or advantage of the present invention to restore displaced soil to where it was removed from without requiring multiple passes through a field.

Another object, feature, or advantage of the present invention is to provide a farm implement that is well-built and durable.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by any objects, features, or advantages stated herein.

According to one aspect an agricultural implement is provided. The agricultural implement includes a main frame, a rotating blade assembly operatively connected to the main frame, the rotating blade assembly comprising a shaft having a plurality of blades mounted thereto, a first grader blade and a second grader blade operatively connected to the main frame. Both the first grader blade and the second grader blade follow the rotating blade assembly such that in operation the plurality of blades positioned along the rotating blade assembly chop up a soil heave into smaller pieces of dirt and the first grader and the second grader push the dirt towards a center. The plurality of blades may include a left set of blades and a right set of blades, each of the left set of blades and the right set of blades comprising a plurality of rows of blades. The plurality of rows of blades may be in a helical arrangement. Each of the left set of blades and the right set of blades may include blades of a first angle, blades of a second angle, and blades of a third angle, with the angle of the blades is smallest nearest the center.

According to another aspect, an agricultural implement includes a main frame having sled rails for being pulled across ground, a rotating blade assembly operatively connected to the main frame, the rotating blade assembly comprising a shaft having a plurality of blades mounted thereto, a first grader blade and a second grader blade pivotably connected to the main frame, a first hydraulic cylinder operatively connected between the main frame and the first grader blade, and a second hydraulic cylinder operatively connected between the main frame and the second grader blade. Both the first grader blade and the second grader blade follow the rotating blade assembly such that in operation the plurality of blades positioned along the rotating blade assembly chop up a soil heave into smaller pieces of dirt and begin the process of moving the soil to the center of the machine. The first grader and the second grader further push the dirt towards a center. The plurality of blades may include a left set of blades and a right set of blades, each of the left set of blades and the right set of blades having a plurality of rows of blades. The plurality of rows of blades may be arranged in a helical arrangement such as a double helical arrangement.

According to another aspect, a method for conditioning soil after installation of drainage tile with a tile plow is provided. The method includes providing an agricultural implement having a main frame, a rotating blade assembly operatively connected to the main frame, the rotating blade assembly comprising a shaft having a plurality of blades mounted thereto, a first grader blade and a second grader blade operatively connected to the main frame, wherein both the first grader blade and the second grader blade follow the rotating blade assembly. The method may further include pulling the agricultural implement over the ground after the installation of the drainage tile with the tile plow such that the plurality of blades positioned along the rotating blade assembly chop up a soil heave into smaller pieces of dirt and the first grader and the second grader push the dirt towards a center. The first grader blade and the second grader blade may be pivotably connected to the main frame. The agricultural implement further includes a first hydraulic cylinder operatively connected between the main frame and the first grader blade and a second hydraulic cylinder operatively connected between the main frame and the second grader blade. The method further includes adjusting angle of the first grader blade and the second grader blade using hydraulic controls operatively connected to the first hydraulic cylinder and the second hydraulic cylinder.

BRIEF DESCRIPTION OF THE DRAWINGS

Illustrated embodiments of the disclosure are described in detail below with reference to the attached drawing figures, which are incorporated by reference herein.

DETAILED DESCRIPTION

The present invention relates to an agricultural implement which is used on agricultural ground after drainage tile has been installed underground leaving a heave of soil in its wake. After drainage tile has been installed such as with a tile plow, trencher, or wheel digger, soil heave remains. The present invention provides for knocking down the heave and pushing dirt back to where the tile went. This avoids humps in the ground which can interfere with normal agricultural practices and field operations.

Figure 1:
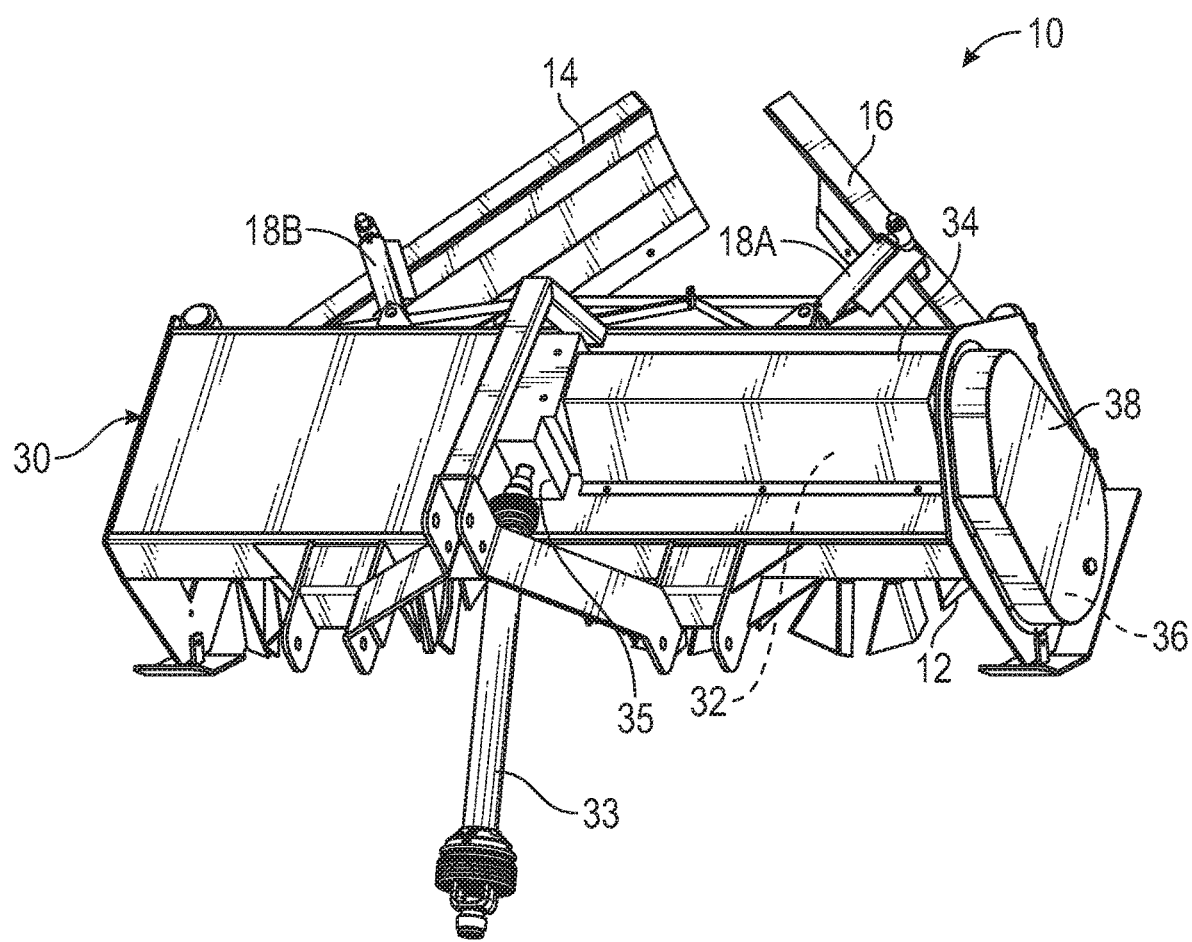
FIG. 1 is a perspective view of one embodiment of an agricultural implement.

FIG. 1 is a perspective view of one embodiment of an agricultural implement 10 configured for being towed over agricultural land where tile lines have been installed. The agricultural implement 10 may connect with a power takeoff of an agricultural vehicle such as a farm tractor (not shown) to drive the shaft 33 which is operatively connected to a gearbox 35 which drives a shaft 32 (covered by cover 34) which in turns drive a chain 36 (covered by chain cover 38) which drives the rotating blade assembly 12. The agricultural implement 10 may include a rotating blade assembly 12 with blades followed by two pivot graders or grader blades 14, 16. The graders 14, 16, are operatively connected to hydraulic cylinders 18A, 18B which are operatively connected to a main frame 30. The cylinders 18A, 18B may be connected with a flow divider so both cylinders receive the same amount of hydraulic fluid. The cylinders 18A, 18B may be identical and may be interchanged. The agricultural implement 10 also connects with hydraulics of the farm tractor (not shown). The position of the grader blades 14, 16 may be adjusted by an operator through hydraulic controls to control the hydraulic cylinders 18A, 18B. In operation, the blades along the rotating blade assembly 12 break up dirt and begin to move the dirt towards center while the grader blades 14, 16 at the wings further push the dirt back towards center.

Figure 2:
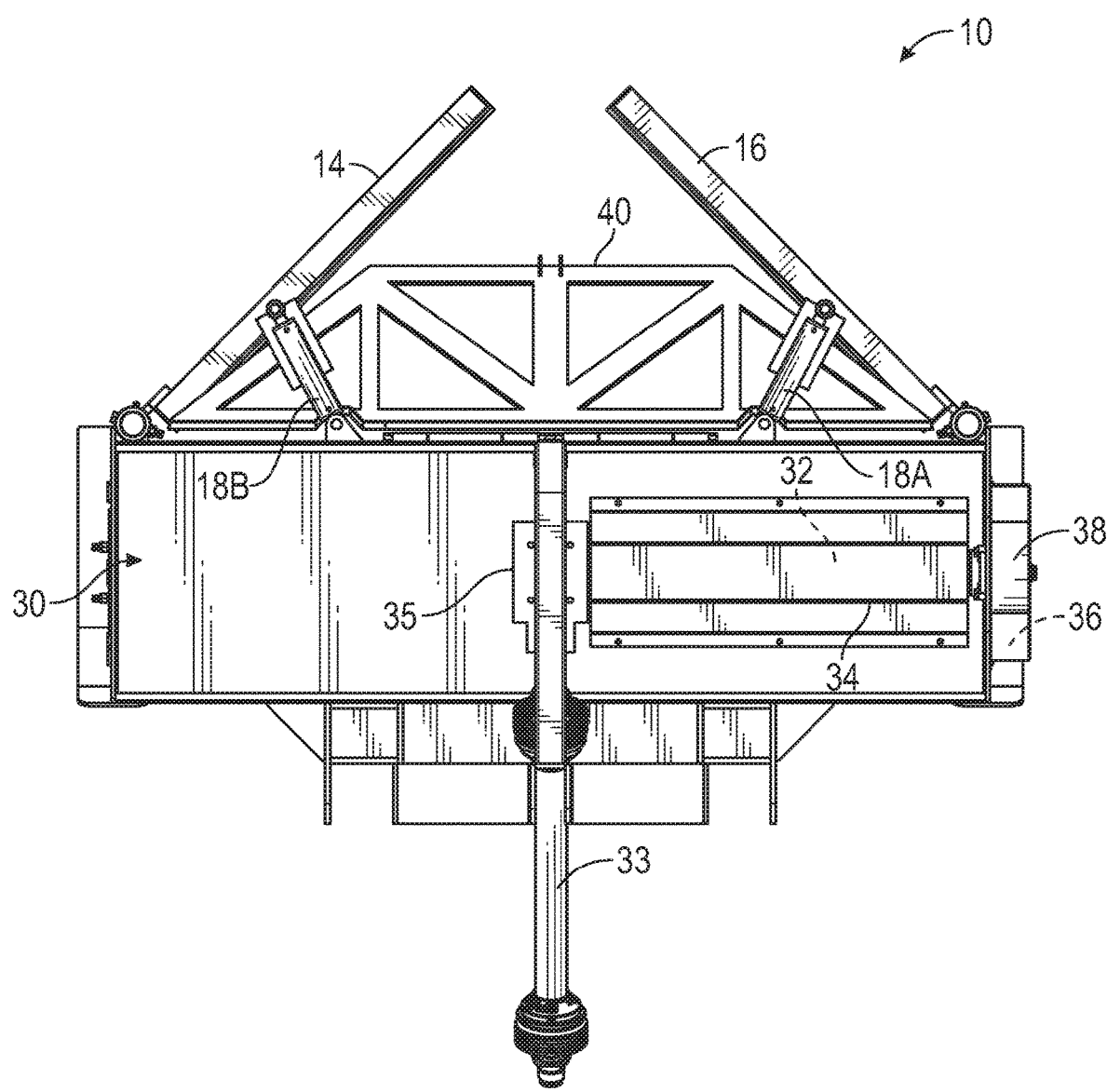
FIG. 2 is a top view of the agricultural implement.
Figure 3:
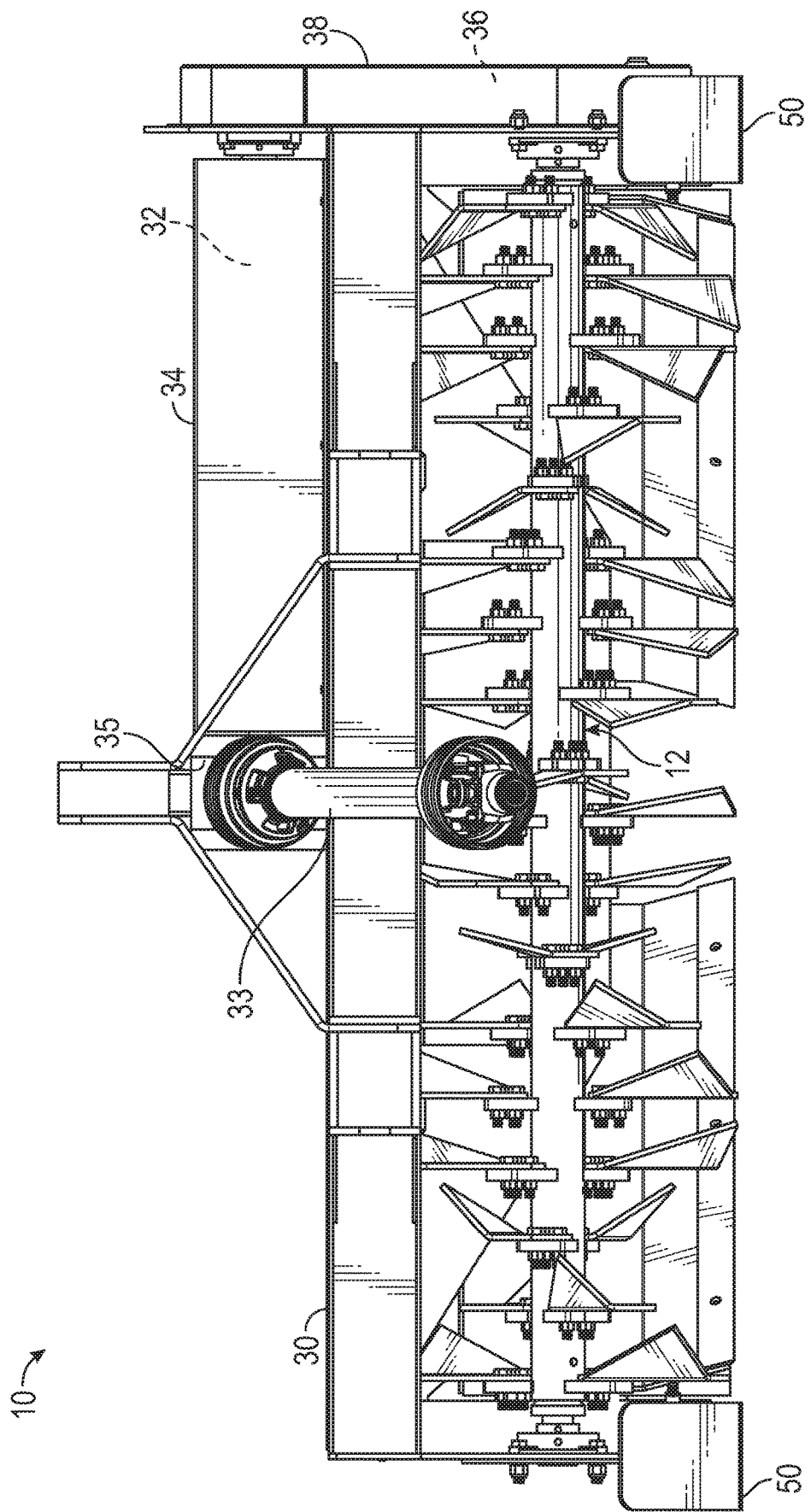
FIG. 3 is a front view of the agricultural implement.
Figure 4:
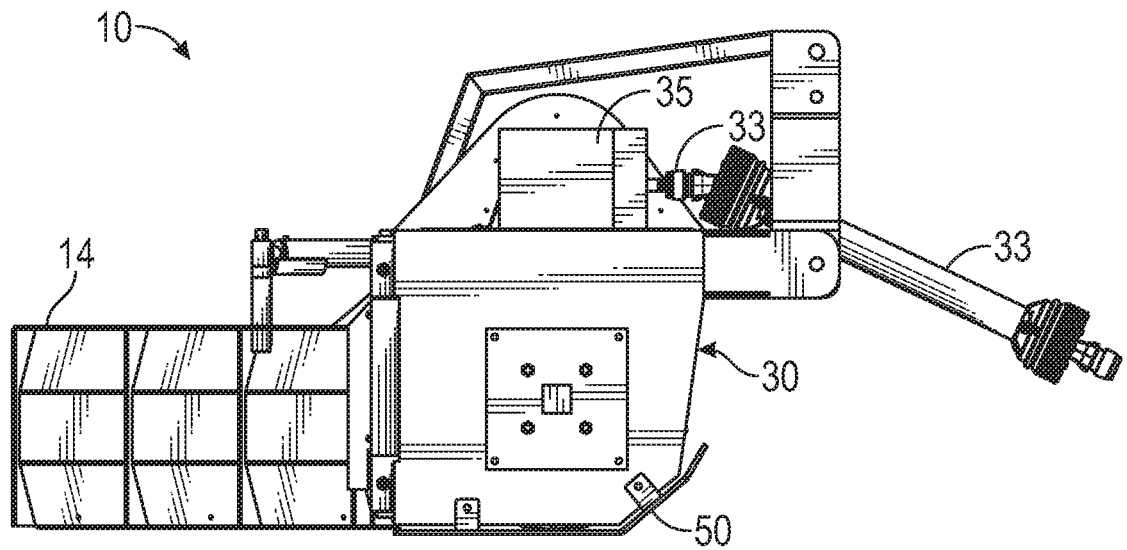
FIG. 4 is a right side view of the agricultural implement.
Figure 5:
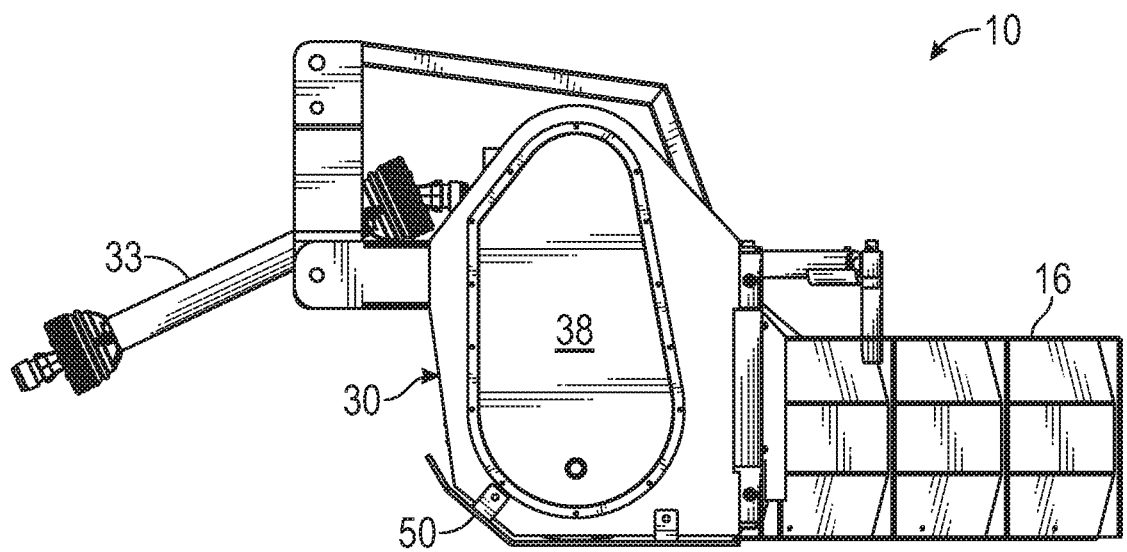
FIG. 5 is a left side view of the agricultural implement.

FIG. 2 is a top view of the agricultural implement 10 while FIG. 3 illustrates a front view of the agricultural implement. FIG. 4 illustrates a right view of the agricultural implement 10 and FIG. 5 illustrates a left view of the agricultural implement 10. A gearbox 35 is shown which may provide for a reduction of about 2:1 reduction and may include a slip clutch for drive line protection. Of course, other ratios are contemplated as may be appropriate for a particular set of manufacturing specifications. A drive shaft cover 34 is shown positioned over the drive shaft 32. A chain cover 38 is shown positioned over a chain 36. The chain 36 may ride in an oil bath and make for about a gear reduction. In operation, a power takeoff of a tractor or other farm vehicle drives a shaft 33 with gearing with gearbox 35 which in turn drives the drive shaft 32 which drives the chain 36 which causes the rotating blade assembly 12 to rotate.

Behind the main frame 30, a shield 40 is positioned to catch rocks or dirt clods. The shield 40 may be of unitary construction or may include multiple portions such as separate shielding for each wing and for the center portion. As best shown in FIG. 3, sled rails 50 are positioned on opposite ends of the main frame 30. Note that in operation the implement is pulled over the ground on the sled rails 50. Thus, unlike a tile closer or a trench follower the operations are being performed on the surface or substantially on the surface as opposed to under the surface. The rotating blade assembly 12 is shown in greater detail. As shown, the rotating bade assembly 12 includes a plurality of rows of blades with two blades per row. The blades are arranged to form a helical pattern. The blade arrangement assists in moving the soil towards center.

Figure 6:
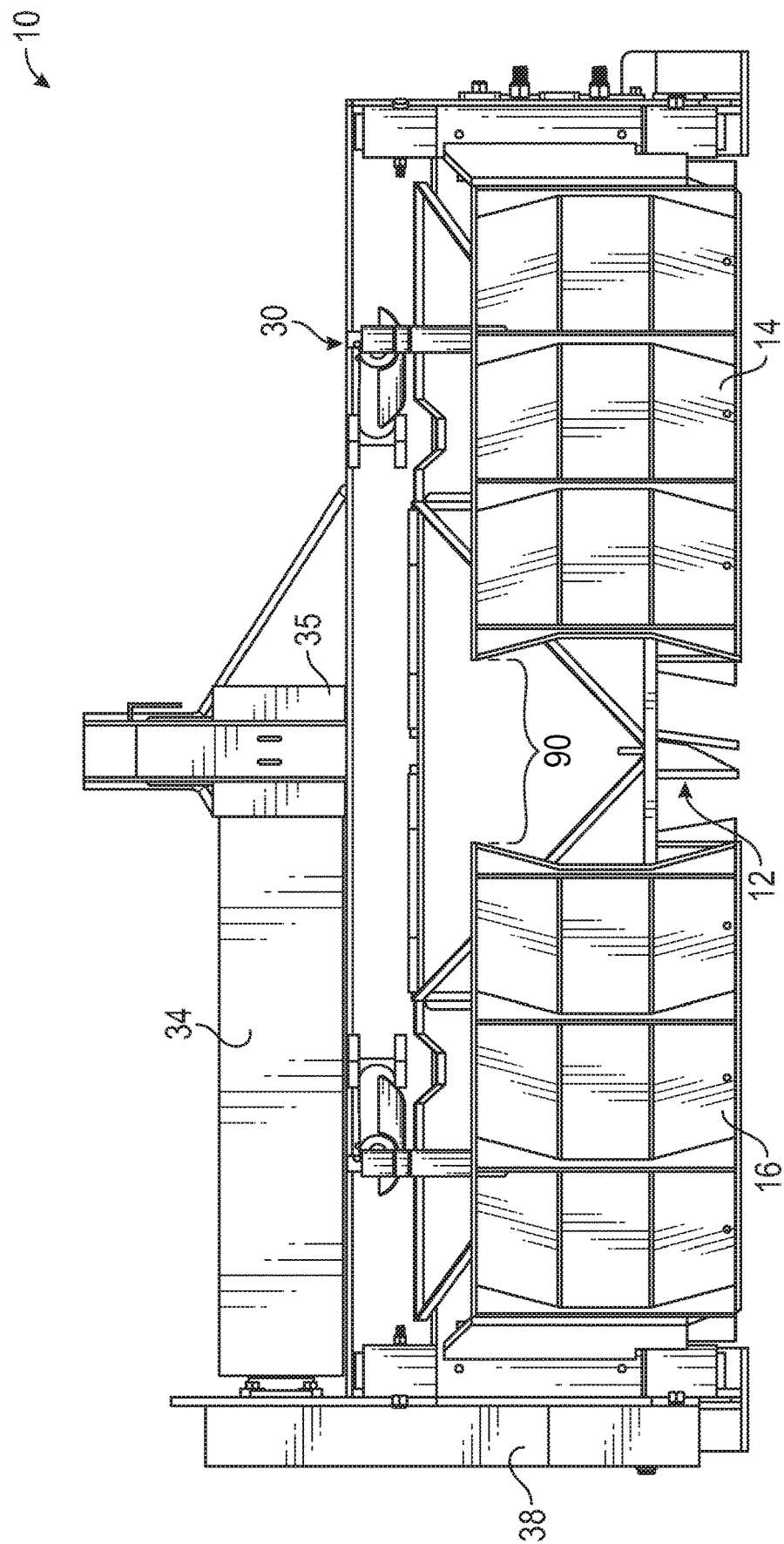
FIG. 6 is back view of the agricultural implement showing the grader blades in more detail.

FIG. 6 is a back view of the agricultural implement 10 showing the pivot graders 14, 16 which are positioned behind the rotating blade assembly 12. The graders 14, 16, follow the rotating blade assembly 12 to further push dirt back to center after chopping by the rotating blade assembly 12. There is a space 94 between the pivot graders 14, 16 at center, with the pivot graders 14, 16 angled to push dirt towards center. This space 94 is user adjustable to allow more material to flow through the machine or to ensure that material is placed directly over where it was originated. In operation, the agricultural implement 10 is driven over the heave centered on the tile line, to chop and bring the dirt back to where it was removed from during tile plowing. The graders blades 14, 16 may include wear strips bolted on bottom. Such wear strips are replaceable and may be flipped and re-mounted after wearing out. Hydraulic controls may be used to pivot the graders 14, 16 to a desired angle to provide for aligning soil towards a center of the trench.

Various types of materials may be used for manufacturing the agricultural implement. For example, abrasion resistant (AR steel) may be used for various components such as the sled rails and the grader blades. The rotating blades and mounting tabs may be made from high strength steel such as A514. Of course, any number of other types of materials may be used as may be appropriate for a particular situation or environment.

Figure 7:
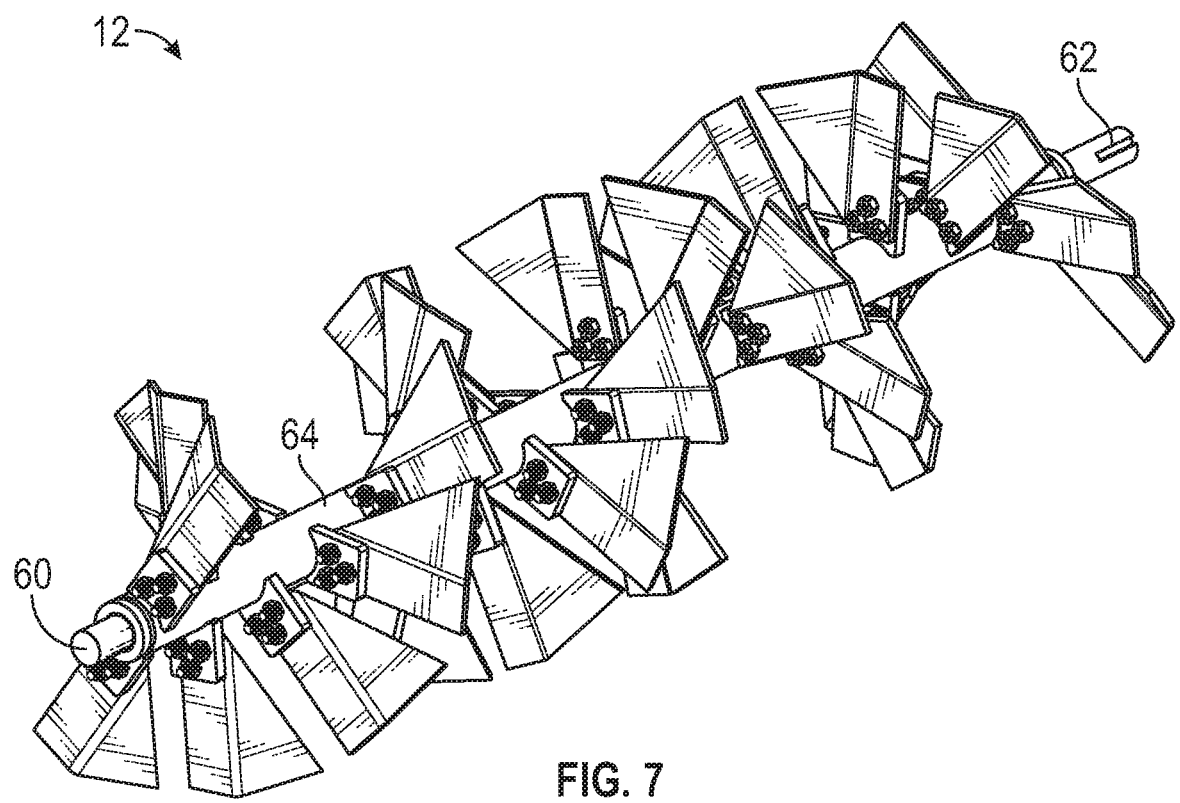
FIG. 7 is a perspective view of the rotating drive shaft with a plurality of blades mounted thereto.
Figure 8:
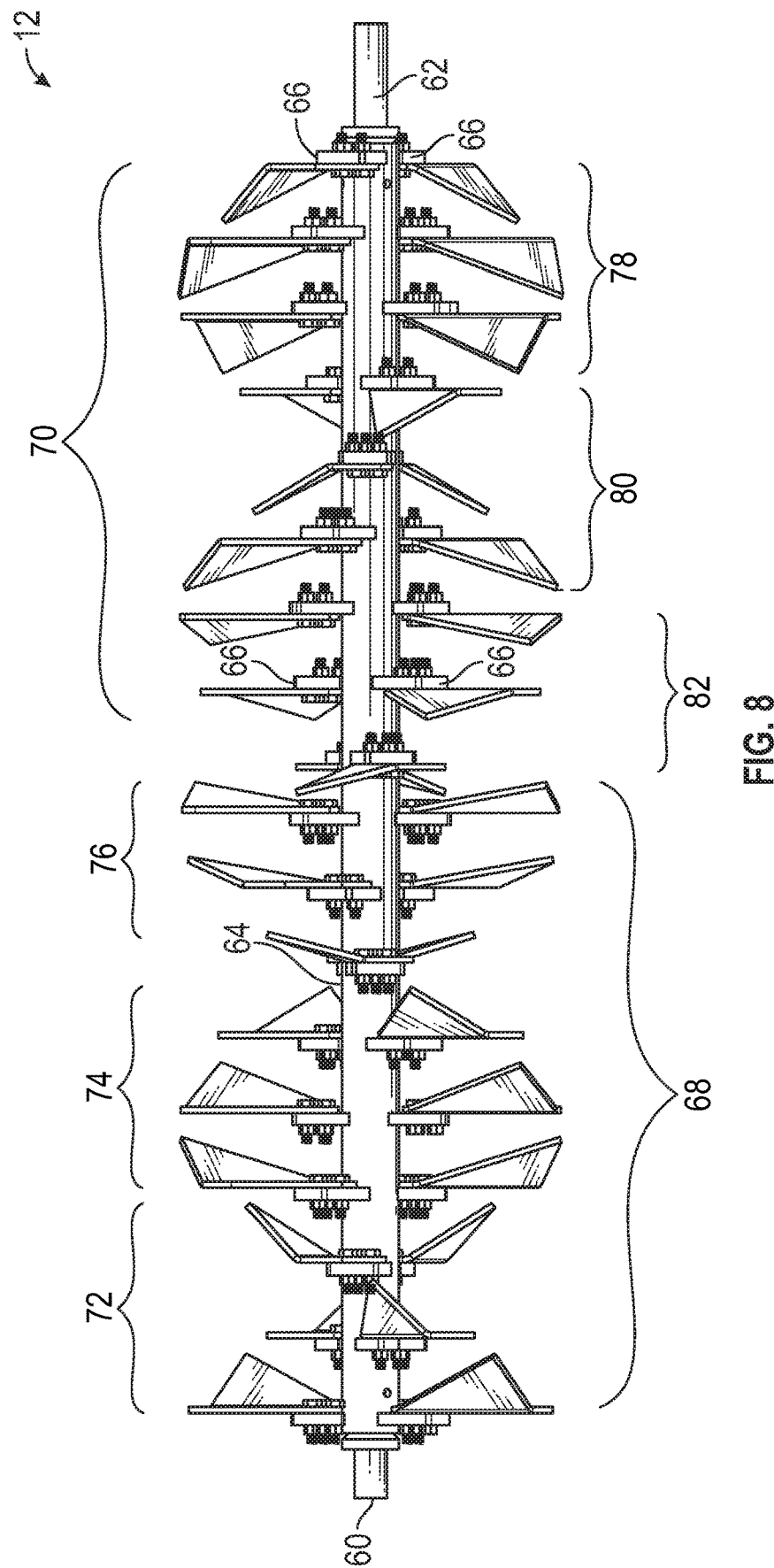
FIG. 8 is another view of the rotating drive shaft with a plurality of blades mounted thereto.

FIG. 7 and FIG. 8 illustrate the blade assembly 12 in greater detail. As shown in FIG. 7, a plurality of blades with mounting tabs are mounted to a tube 64. Stub shafts 60, 62 are shown on opposite sides of the tube 64. As shown in FIG. 8, each of the blades is mounted to the inside towards the center. There is a subset of the plurality of blades left of center 68 and another subset of the plurality of blades right of center 70, with the inside of all of the blades directed towards the center. In the specific embodiment shown there are thirty-six (36) blades in total with eighteen (18) blades on each side. The outside three rows of the blades 72, 78 are 45-degree angle blades. The middle three rows of blades 74, 80 are 30-degree angle blades. The inside three rows of the blades 76, 82 are 15-degree angle blades. Thus, the angle of the blades changes based on position of the blade along the tube 64. As shown, there are two blades in each row with the blades positioned on opposite blade tabs 66 so that the blades are separated by 180 degrees. The blades are mounted along the tube in a helical arrangement. With two rows present there is a double helix in terms of the position of the blades. The left side and the right side both have the blades facing center thus in operation the blades rotate towards center chopping up dirt at the same time. The double helix arrangement towards the center allows weight to be balanced out thereby providing more balance and stability than would be achieved if a single helix was used. Moreover, the design of the blades including the change in angles of the blades along the rotating blade assembly assists in moving the chopped soil towards center. Although specific angles of blades and specific placement of blades are shown and described, it is to be understood that other blade angles may be used, and blades may be otherwise positioned in different arrangements.

Figure 9:
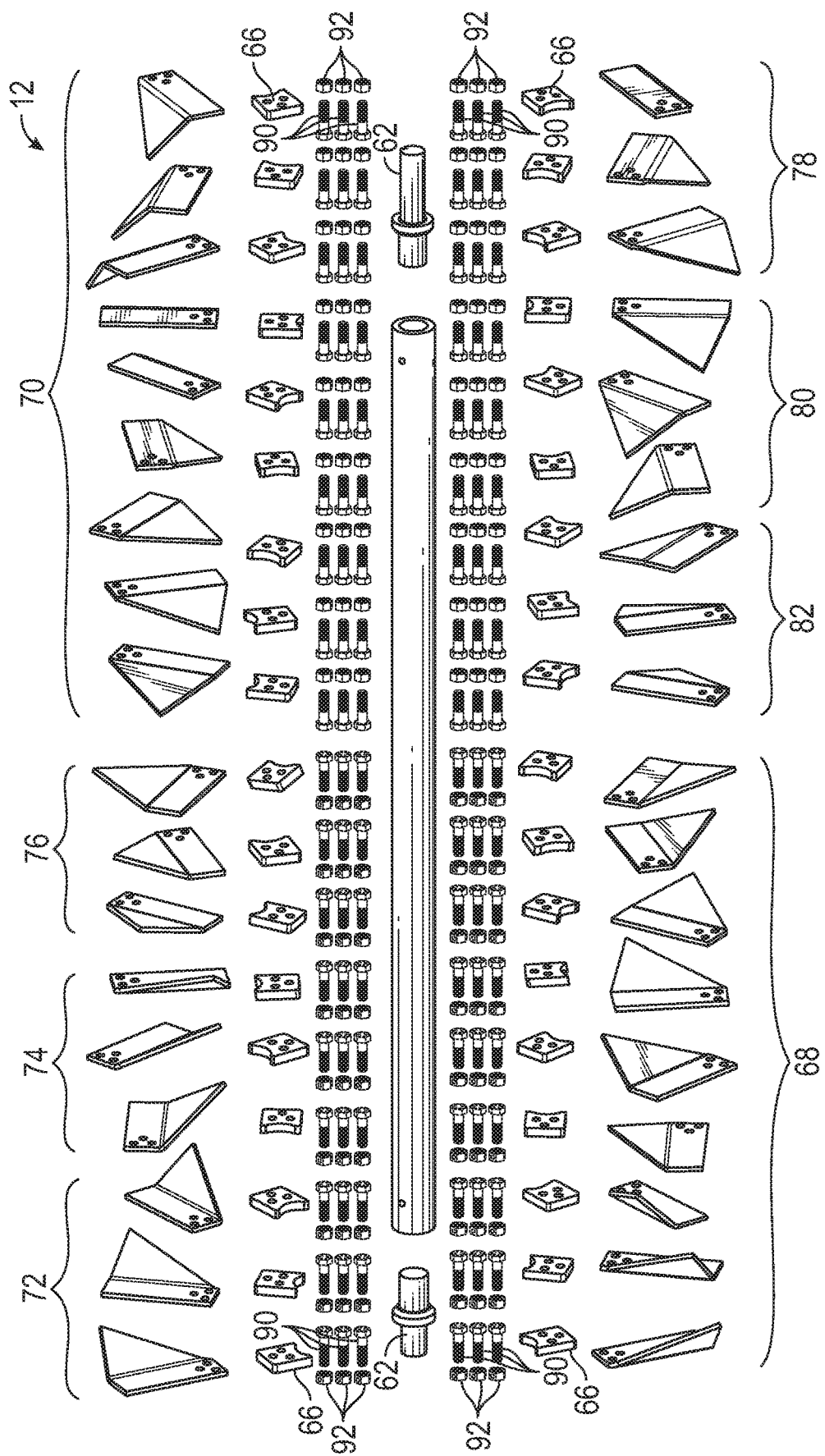
FIG. 9 is an exploded view of the rotating drive shaft.

FIG. 9 is an exploded view of the rotating blade assembly 12. Stub shafts 60, 62 are shown on opposite sides of the tube 64. The blades 68, 70, mounting tabs 66, and mounting screws 90 and lock nuts 92 are shown. It is to be understood that the blades may be attached in alternative manners if desired.

Therefore, an agricultural implement has been shown and described. The invention is not to be limited to the particular embodiments described herein. In particular, the invention contemplates numerous variations in the number of blades and placement of blades, gearing to rotate the blades, and other variations. The foregoing description has been presented for purposes of illustration and description. It is not intended to be an exhaustive list or limit any of the invention to the precise forms disclosed. It is contemplated that other alternatives or exemplary aspects are considered included in the invention. The description is merely examples of embodiments, processes or methods of the invention. It is understood that any other modifications, substitutions, and/or additions can be made, which are within the intended spirit and scope of the invention.

What is claimed is:

1. An agricultural implement, comprising:
   a main frame;
   a rotating blade assembly operatively connected to the main frame and configured to be driven by a power takeoff of an agricultural vehicle, the rotating blade assembly comprising a shaft having a plurality of blades mounted thereto;
   a first grader blade and a second grader blade operatively connected to the main frame such that the first grader blade and the second grader blade extend rearwardly away from the main frame and inwardly towards a center;
   wherein both the first grader blade and the second grader blade follow the rotating blade assembly such that in operation the plurality of blades positioned along the rotating blade assembly chop up a soil heave into smaller pieces of dirt and the first grader and the second grader push the dirt towards the center.

2. The agricultural implement of claim 1 wherein the plurality of blades of the rotating blade assembly are arranged to push the soil towards the center.

3. The agricultural implement of claim 2 wherein the plurality of blades comprises a left set of blades and a right set of blades, each of the left set of blades and the right set of blades comprising a plurality of rows of blades.

4. The agricultural implement of claim 3 wherein the plurality of rows of blades form a first helical arrangement and a second helical arrangement.

5. The agricultural implement of claim 3 wherein each of the left set of blades and the right set of blades comprise blades of a first angle and blades of a second angle, the first angle different from the second angle.

6. The agricultural implement of claim 5 wherein each of the left set of blades and the right set of blades each comprise blades of a third angle, the third angle different from the first angle and the second angle.

7. The agricultural implement of claim 5 wherein the first angle is smaller than the second and wherein the blades of the first angle are positioned closer to the center then the blades of the second angle.

8. The agricultural implement of claim 1 wherein the first grader blade is pivotably connected to the main frame and wherein the second grader blade is pivotably connected to the main frame.

9. The agricultural implement of claim 8 further comprising a first hydraulic cylinder operatively connected between the first grader blade and the main frame and a second hydraulic cylinder operatively connected between the second grader blade and the main frame.

10. An agricultural implement, comprising:
    a main frame having first and second opposite sled rails for being pulled across ground, the sled rails defining a horizontal ground plane extending therebetween;
    a rotating blade assembly operatively connected to the main frame, the rotating blade assembly comprising a shaft having a plurality of blades mounted thereto such that the plurality of blades do not extend below the horizontal ground plane defined by the sled rails;
    a first grader blade and a second grader blade pivotably connected to the main frame such that the first grader blade and the second grader blade extend rearwardly away from the main frame and inwardly between the opposing sled rails;
    a first hydraulic cylinder operatively connected between the main frame and the first grader blade;
    a second hydraulic cylinder operatively connected between the main frame and the second grader blade;
    wherein both the first grader blade and the second grader blade follow the rotating blade assembly such that in operation the plurality of blades positioned along the rotating blade assembly chop up a soil heave into smaller pieces of dirt and the first grader and the second grader push the dirt towards a center.

11. The agricultural implement of claim 10 wherein the plurality of blades comprises a left set of blades and a right set of blades, each of the left set of blades and the right set of blades comprising a plurality of rows of blades.

12. The agricultural implement of claim 11 the plurality of rows of blades form a first helical arrangement and a second helical arrangement.

13. The agricultural implement of claim 11 wherein each of the left set of blades and the right set of blades comprise blades of a first angle and blades of a second angle, the first angle different from the second angle.

14. The agricultural implement of claim 13 wherein each of the left set of blades and the right set of blades each comprise blades of a third angle, the third angle different from the first angle and the second angle.

15. The agricultural implement of claim 11 wherein the first angle is smaller than the second and wherein the blades of the first angle are positioned closer to the center then the blades of the second angle.

16. The agricultural implement of claim 10 wherein the plurality of blades of the rotating blade assembly are arranged to push the soil towards the center.

17. A method for conditioning soil after installation of drainage tile, the method comprising:
    providing an agricultural implement comprising:
       a main frame;
       a rotating blade assembly operatively connected to the main frame and configured to be driven by a power takeoff of an agricultural vehicle, the rotating blade assembly comprising a shaft having a plurality of blades mounted thereto;
       a first grader blade and a second grader blade operatively connected to the main frame such that the first grader blade and the second grader blade extend rearwardly away from the main frame and inwardly towards a center;
       wherein both the first grader blade and the second grader blade follow the rotating blade assembly;
    pulling the agricultural implement over the ground with the agricultural vehicle after the installation of the drainage tile with the rotating blade assembly driven by the power takeoff of the agricultural vehicle and such that the plurality of blades positioned along the rotating blade assembly chop up a soil heave into smaller pieces of dirt and the first grader and the second grader push the dirt towards the center.

18. The method of claim 17 wherein the first grader blade and the second grader blade are pivotably connected to the main frame and wherein the agricultural implement further comprises a first hydraulic cylinder operatively connected between the main frame and the first grader blade and a second hydraulic cylinder operatively connected between the main frame and the second grader blade.

19. The method of claim 18 further comprising adjusting angle of the first grader blade and the second grader blade using hydraulic controls operatively connected to the first hydraulic cylinder and the second hydraulic cylinder.

20. The method of claim 17 wherein the plurality of blades is organized into a first row of blades and a second row of blades, forming a first helical arrangement and a second helical arrangement.

\* \* \* \* \*